(12) United States Patent
Engstrom et al.

(10) Patent No.: US 11,964,612 B2
(45) Date of Patent: Apr. 23, 2024

(54) WARNING LIGHT CONTROLLER

(71) Applicant: Meadow Stream Distributing, L.L.C., Bettendorf, IA (US)

(72) Inventors: Richard Freitag Engstrom, Bettendorf, IA (US); Chih Heng Lin, Taipei (TW)

(73) Assignee: Meadow Stream Distributing, L.L.C., Bettendorf, IA (US)

(*) Notice: Subject to any disclaimer, the term of this patent is extended or adjusted under 35 U.S.C. 154(b) by 135 days.

(21) Appl. No.: 17/150,328

(22) Filed: Jan. 15, 2021

(65) Prior Publication Data

US 2022/0153191 A1    May 19, 2022

(51) Int. Cl.
| | | |
|---|---|---|
| *B60Q 3/82* | (2017.01) | |
| *B60Q 3/74* | (2017.01) | |
| *H05B 47/155* | (2020.01) | |
| *H05B 47/16* | (2020.01) | |
| *H05B 47/17* | (2020.01) | |
| *H05B 47/175* | (2020.01) | |
| *H05B 47/19* | (2020.01) | |

(52) U.S. Cl.
CPC ............. *B60Q 3/82* (2017.02); *B60Q 3/74* (2017.02); *H05B 47/155* (2020.01); *H05B 47/16* (2020.01); *H05B 47/17* (2020.01); *H05B 47/175* (2020.01); *H05B 47/19* (2020.01); *B60Q 2900/30* (2013.01)

(58) Field of Classification Search
CPC ........ B60Q 3/82; B60Q 3/74; B60Q 2900/30; B60Q 1/0076; H05B 47/155; H05B 47/16; H05B 47/17; H05B 47/175; H05B 47/19; H05B 47/165; Y02B 20/40
See application file for complete search history.

(56) References Cited

U.S. PATENT DOCUMENTS

| | | | |
|---|---|---|---|
| 2016/0023588 A1* | 1/2016 | Peterson | B60Q 1/441 315/77 |
| 2016/0347239 A1* | 12/2016 | Diaz, Jr. | B60Q 1/305 |
| 2017/0119078 A1* | 5/2017 | Chen | A42B 3/125 |
| 2018/0242658 A1* | 8/2018 | Dal Lago | B62J 6/165 |
| 2021/0245776 A1* | 8/2021 | Furtado | B60K 35/00 |

OTHER PUBLICATIONS

China National Intellectual Property Administration; Office Action dated Jul. 5, 2021; Application No. 11020624110.

* cited by examiner

*Primary Examiner* — Renan Luque
(74) *Attorney, Agent, or Firm* — Lane & Waterman LLP

(57) ABSTRACT

A controller for a warning light is disclosed. The controller is composed of a housing, a light emitting element and a control unit. The control unit is in operable communication with the light emitting element of the controller and a light emitting element of a warning light. The controller instructs the light emitting element of the warning light and the light emitting element of the controller to display light in the same lighting mode, which allows vehicle operators to immediately know the lighting mode of the warning light by viewing the lighting mode of the controller.

18 Claims, 5 Drawing Sheets

WARNING LIGHT CONTROLLER

PRIORITY

This application claims the benefit of Taiwanese Utility Patent Application No. 109215078 and Taiwanese Invention Patent Application No. 109139942, entitled Controller for Warning Light, which were filed on Nov. 16, 2020, and are hereby incorporated by reference in their entireties.

BACKGROUND

As is well known in the art, vehicles have many different types of lights such as headlights, auxiliary lights, tail lights, turn signals, stop lights, and hazard lights mounted at different positions. These safety lights, which often emit lights of different colors, not only increase the visibility of the vehicle but also light the roadway for the driver while driving in the dark or at night.

Nevertheless, many vehicle operators need additional lights to counteract poor weather such as heavy rain or fog and for additional safety on work and commercial vehicles. Many vehicle operators mount additional various types of warning lights for warning and signaling purposes on the vehicles to attract the attention of road users. In many instances, these warning lights have multiple lighting patterns that can be displayed for different users. These additional warning lights are generally controlled by a controller within the vehicle, such as a simple controller or a screen. However, the controllers known in the art generally do not allow an operator to immediately know if the warning light is displaying the requested pattern. Furthermore, they may be inconvenient to use, especially while the vehicle is in motion. In many instances, the controller can only be installed in a certain position inside the vehicle and this position may not be optimal for the user.

Thus there is room for improvement in warning light controllers.

SUMMARY

The present disclosure relates to improved controllers for warning lights. Advantageously, the controller has a light emitting element that can be synchronized with the mode of a light emitting element on the warning light. According to one aspect, the controller comprises a controller housing, a light emitting element, and a control unit. In one embodiment, the controller is operably connected to the warning light via wiring. In another aspect, the controller is operable connected to one or more warning lights wirelessly. The warning light is responsive to a signal from the controller to display a certain lighting mode. In many instances, this lighting mode will also be displayed by the light emitting element of the controller. This allows the vehicle operator to easily view the lighting mode of the warning light by viewing the controller.

In many embodiments, the light emitting element on the controller can be turned on or off independently of the warning light. The light emitting element on the controller can also be instructed to automatically turn off.

A method of controlling a warning light is also contemplated.

BRIEF DESCRIPTION OF THE DRAWINGS

The disclosed embodiments can be best understood by referring to the following detailed description and the accompanying drawings.

DETAILED DESCRIPTION

A specialized controller for vehicle warning lights is disclosed. The controller includes a light emitting element on a controller housing, wherein the light emitting element provides light emission which mimics the lighting of vehicle warning lights. Thus, vehicle users can control the vehicle warning lights while easily being able to confirm vehicle warning light use based on the light emitting element of the controller.

Figure 1:
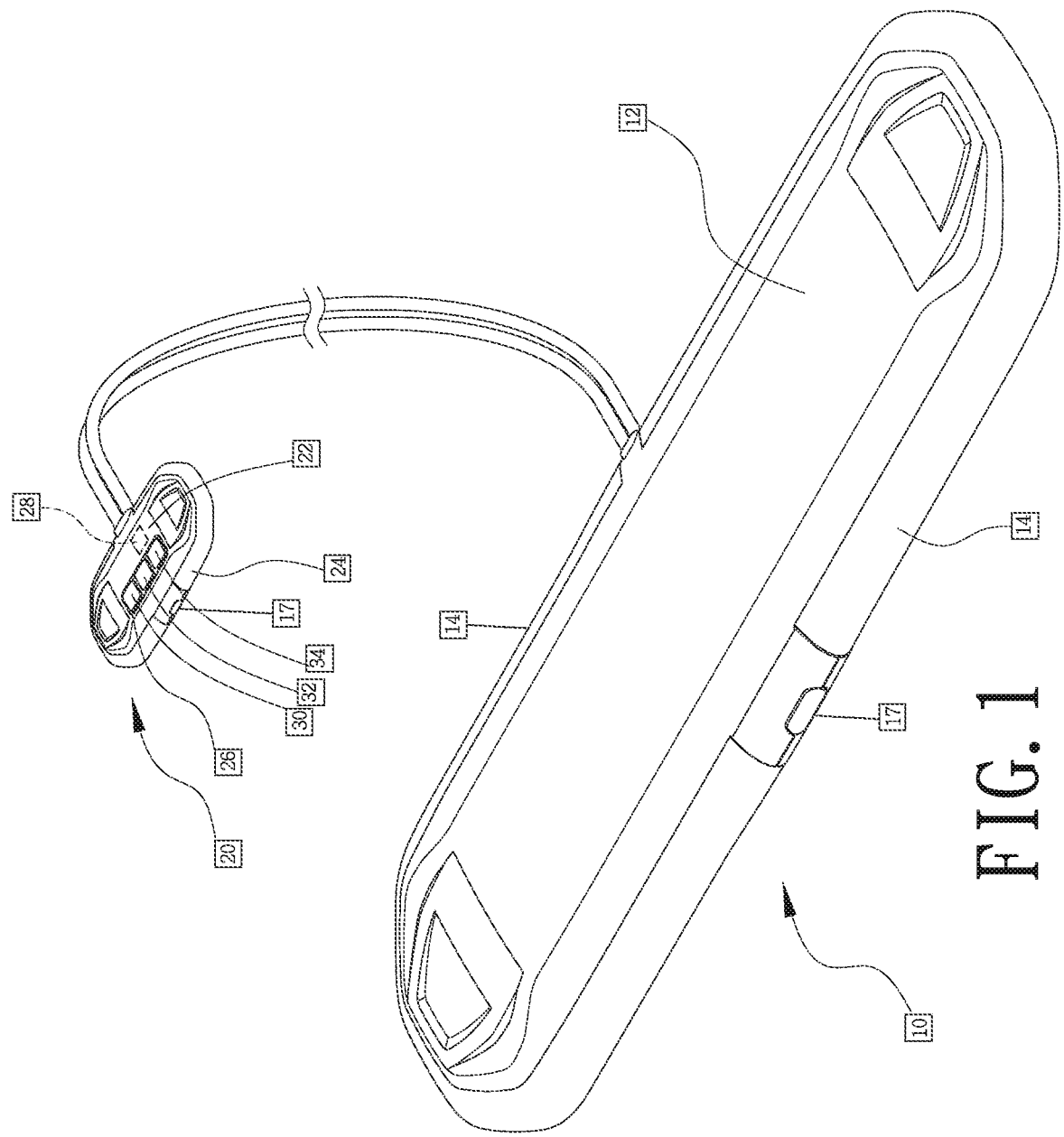
FIG. 1 is a perspective view of an embodiment of the warning light controller and a corresponding warning light.

Referring to FIG. 1, a warning light 10 and a controller 20 are disclosed. Warning light 10 has a housing 12 and a light emitting element 14 and is adapted to be placed on the outside of a vehicle. These types of lights are well known in the art and not meant to be limiting. An example is the Pro LED SLP1030, sold by Pro Trucking Products. Although these warning lights can come in different configurations, one configuration is bar shaped. These warning lights are commonly capable of numerous flash patterns, for example 19 or 20 or more different patterns. In the warning light shown in FIG. 1, each half of the light is capable of lighting separately. Warning lights, such as the one referenced above, have control units built into the light itself, allowing the light to be controlled by a simple electrical switch attached to a power supply. There are also lights known in the art that do not have their own control unit but are dependent upon a control unit in a controller. Controllers may have their own control unit or it may be a signal receiver from a controller in the light. The disclosed controller contemplates both.

Figure 2:
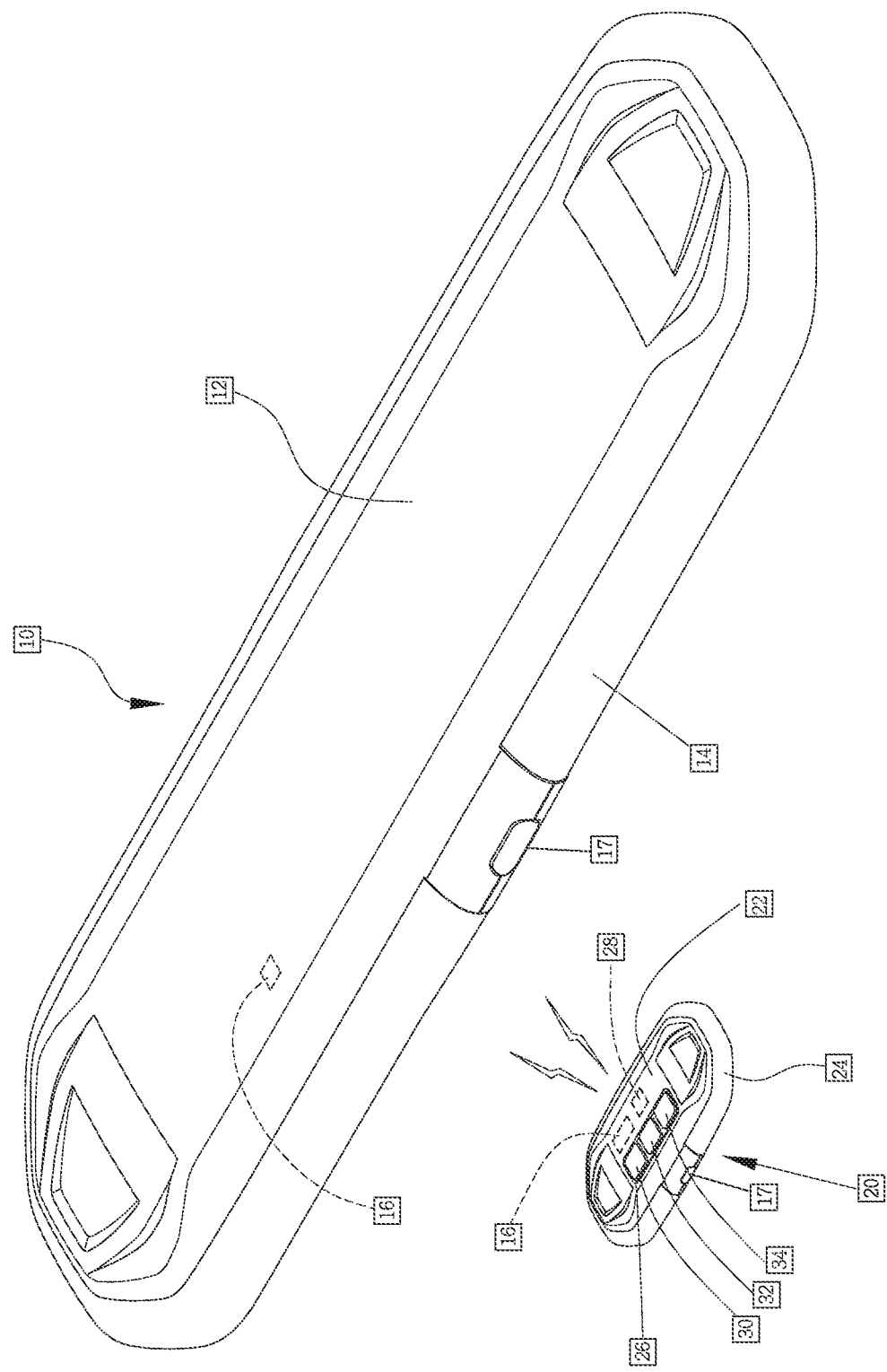
FIG. 2 is a perspective view of an additional embodiment of the warning light controller and a corresponding warning light.

In FIG. 1, controller 20 comprises a housing 22, a light emitting element 24 fitted on the housing 22, a control unit 26, and at least one control button 30. In the disclosed embodiment of FIG. 1, control unit 26 includes three control buttons, i.e. 30, 32, 34. In most embodiments, housing 22 and light emitting element 24 have the same shape and style as housing 12 and light emitting element 14. However, this is not required and housing 22 may be any shape that works with the rest of the disclosure. For example, housing 22 may be rectangular or square. In one embodiment, such as the embodiment of FIG. 1, controller 20 and warning light 10 are connected by wires. In the embodiment of FIG. 2, controller 20 and warning light 10 are wirelessly connected through a wireless transmitter 28 and wireless receiver 16. In this embodiment, controller 20 may not have an independent control unit and may be controlled completely by the control unit (not shown) in warning light 10. As is understood, in this situation synchronization of the light emitting elements is not required as controller 20 is a signal receiver. This embodiment has functionality to send a signal to controller 20 to display a different light pattern than what is being displayed on warning light 10. In most embodiments, light emitting elements 14 and 24 are LED lights. However, the type of light emitting element is not meant to be limiting. Any appropriate light emitting element, as well as any color of light emitting element, can be used. For example, several different types of LED lights such as SMD LED, COB LED, Dip LED, OLED, RGB LED, CMYK LED, and QLED are contemplated.

Controller 20 controls the light pattern of warning light 10 as is generally known in the art. In one embodiment, controller 20 acts simply as an electrical switch. Warning light 10 is connected to a power supply (not shown) through controller 20. Controller 20 has three control buttons 30, 32, 34 in the embodiment disclosed in FIG. 1. However, it is to be understood that the order and number of buttons is not meant to be limiting as long as the buttons allow controller 20 to be used as an electrical switch for warning light 10. In the embodiment of FIG. 1, control button 34 is this electrical switch and turns the entire system, i.e. the controller and the warning light, on or off. Control button 30 controls the pattern changes of warning light 10 and controller 20. In this embodiment, controller 20 has its own embedded control unit 26 and can be controlled independently of warning light 10. For example, in the wired embodiment of FIG. 1, controller 20 can be detached from warning light 10 but remain attached to the power supply (not shown). Controller 20 can also be battery powered, such with one or more internal batteries.

Control button 30 can be held for a predetermined period of time, i.e. 10 seconds, to synchronize the light emitting elements of warning light 10 and controller 20. In most instances, control button 30 is pressed multiple times to cycle through the available warning light patterns. Control button 32 turns off light emitting element 24 of controller 20. In some embodiments, controller 20 is programmed to turn off light emitting element 24 automatically or manually after a preset period of time. This can reduce power consumption and avoid glare. Generally these control buttons can be used while the vehicle is in use.

Figure 3:
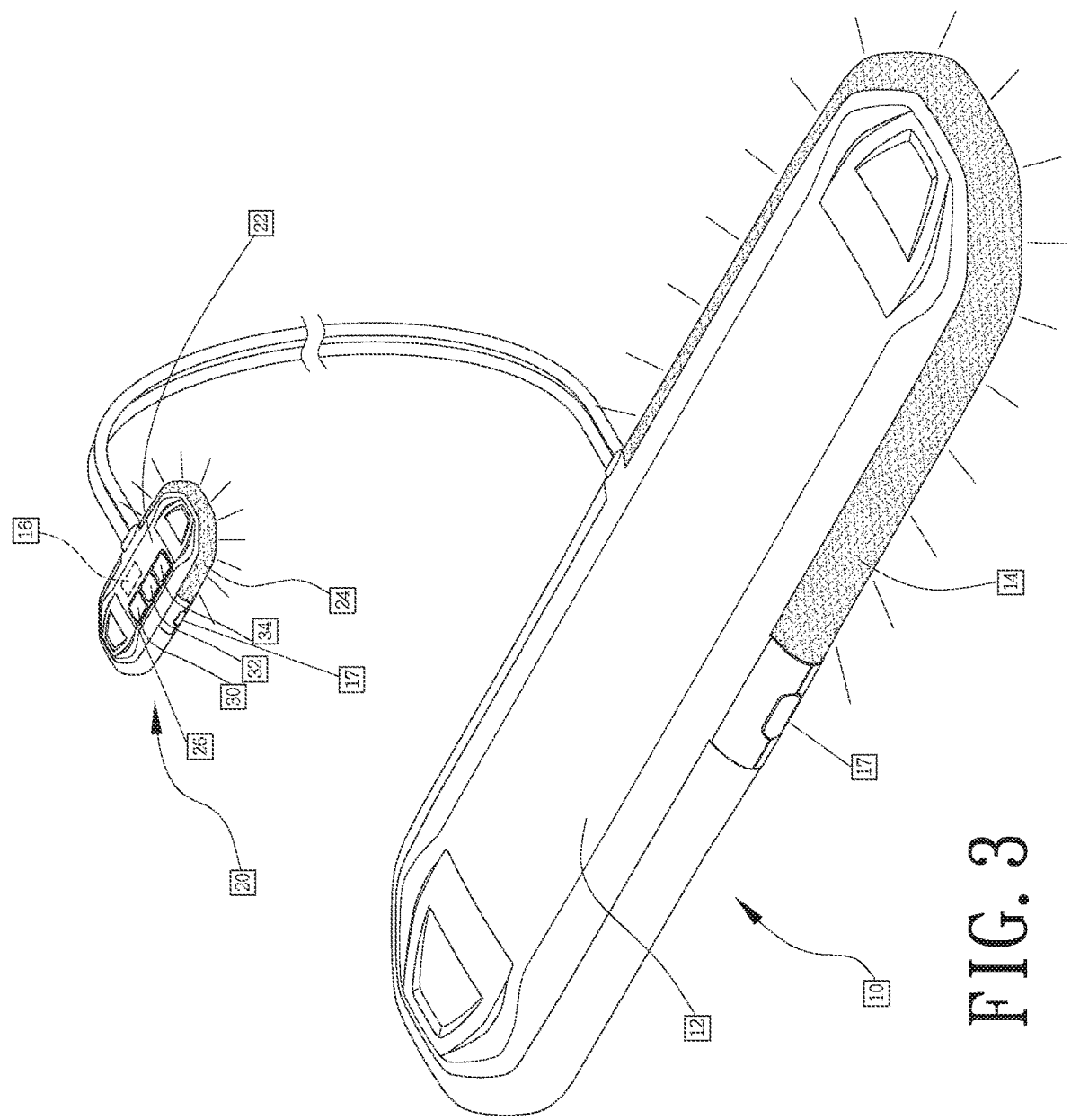
FIG. 3 is a schematic drawing showing an embodiment of the warning light controller in use with a warning light.

With reference to FIG. 3, an operating instruction from controller 20 instructs light emitting element 24 to match the mode of lighting element 14 on warning light 10. As stated above, in many cases, this operating instruction is depression of a control button 30 on controller 20 for a certain period of time, which can be about 5 seconds, about 10 seconds, about 15 seconds or the like. Then, when an operator instructs controller 20 to change warning light 10 to a different lighting mode by engaging control button 30, light emitting element 24 is switched to the same lighting mode. Different lighting modes for warning lights, such as flashing, left only, right only, etc., are known in the art and are not meant to be limiting. Any possible lighting mode that will work with controller 20 and warning light 10 is contemplated. After this instruction, even if the light emitting element 24 on controller 20 is turned off, when it is turned back on, it will continue to match the lighting mode of light emitting element 14 without requiring new synchronization. Warning light and controller may also optionally include indicator 17, which indicates if the entire system is on or off. In many cases, indicator 17 is a LED light.

In the disclosed embodiments, light emitting element 24 is disposed along the periphery of controller 20. For wireless controllers, light emitting element 24 may be completely around the periphery of controller. For wired controllers, light emitting element may be around the periphery of controller 20 except for where the wiring goes into controller 20. This allows light emitting element 24 to send light out in all directions when on. The positioning of different light emitting elements on controller 20 are anticipated. For example, controller 20 could have two individual lights on each horizontal end of controller 20, which match the lighting pattern of warning light 10. Or light emitting element 24 is disposed around only the horizontal edges of controller 20.

Because the lighting pattern on the controller can match the lighting pattern of the warning light, the disclosed device allows a vehicle operator to easily and immediately determine if they have entered the intended pattern for the warning light. It does not require learning of the meaning of different controller lights, such as what has previously been known in the art. This is significantly safer than having the operator try to check the pattern on the warning light by checking the mirrors or looking out the window. It is also a convenient time saver for the operator as the controller can be placed anywhere in the vehicle interior that the operator prefers. Thereby the disclosed controller is more convenient to use.

Figure 4:
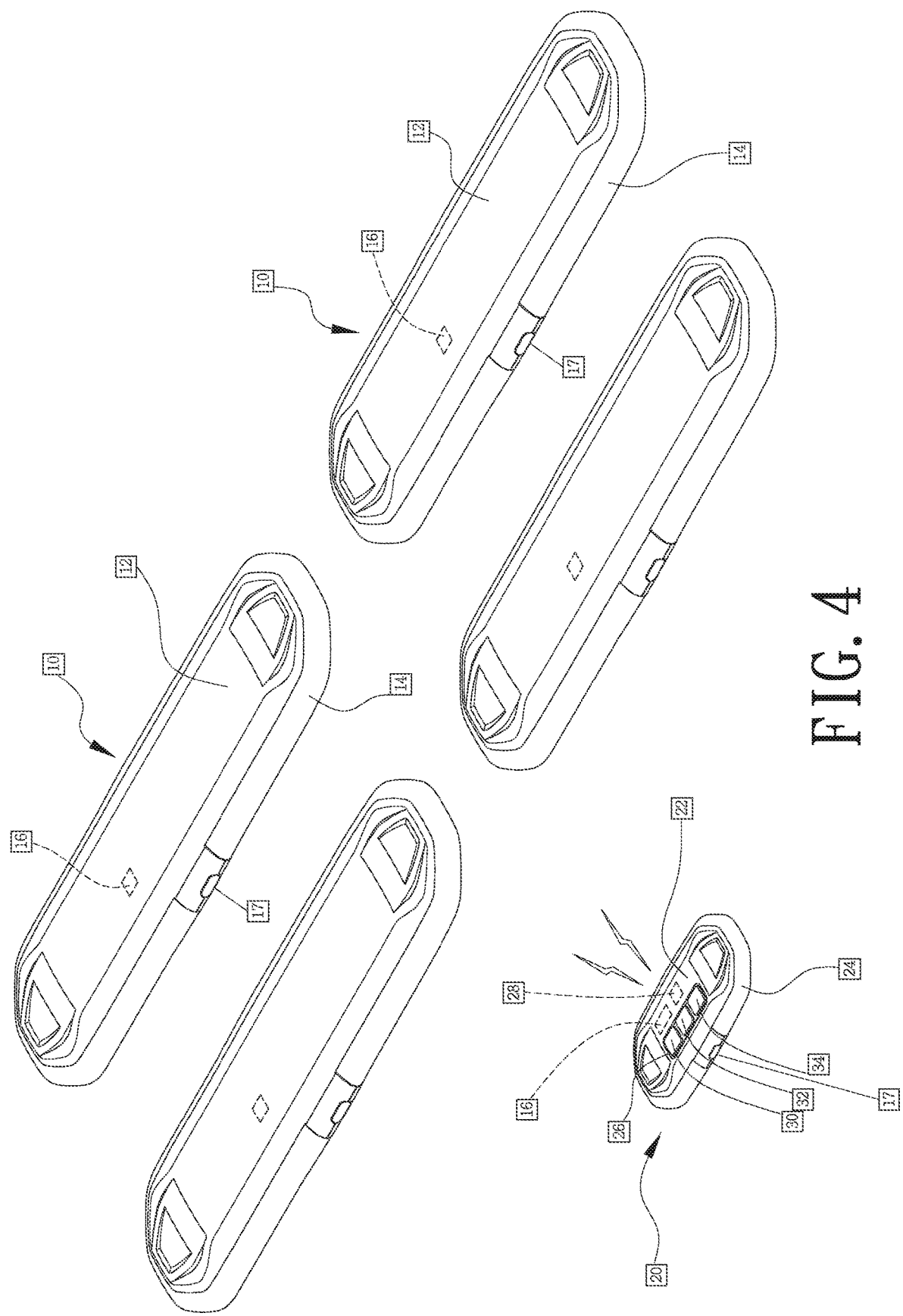
FIG. 4 is a perspective view of yet a further embodiment of the warning light controller.

A further embodiment is disclosed in FIG. 4. In this embodiment, controller 20 controls a plurality of warning lights 10.

Figure 5:
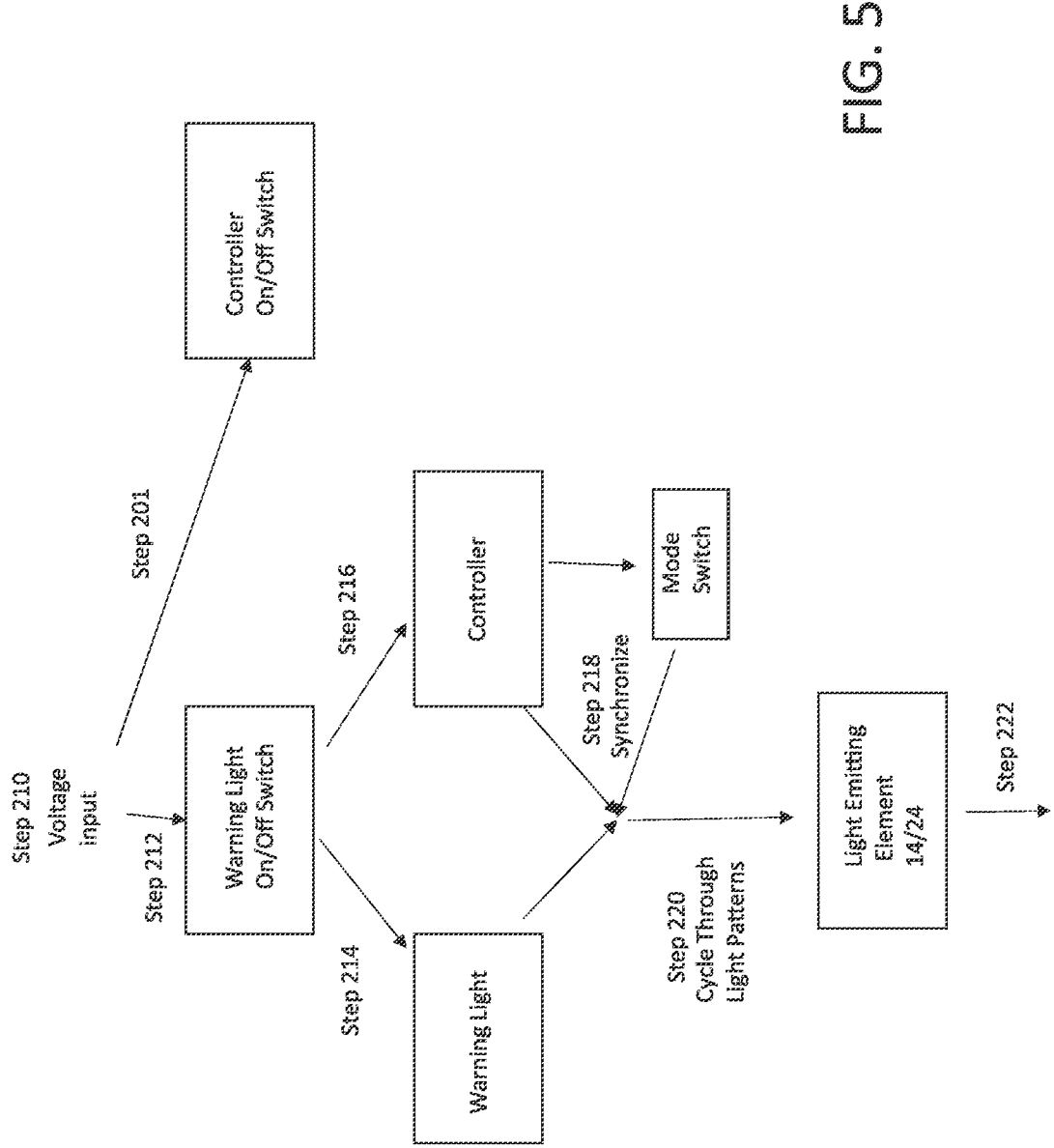
FIG. 5 is a flow diagram of an exemplary process of the disclosed system.

FIG. 5 demonstrates an exemplary process of use of controller 20. Briefly, in step 210 voltage is placed into the system. In most cases, this will be power coming from wiring from the vehicle. However, it is to be understood, that any power source, including one or more batteries within the system are contemplated. In step 212, warning light on/off electrical switch is activated. In the embodiments of the Figures, this switch is a control button 34. However, the electrical switch may be in any shape that allows the warning light on/off switch to be activated. For example, a physical switch may be used. Once warning light on/off switch has been activated, Step 214/Step 216 instruct warning light 10 and controller 20, respectively to display a light emitting pattern. If an operator wishes for warning light 10 and controller 20 to be synchronous, mode switch is depressed for 10 seconds as is demonstrated in step 218. Following synchronization, control button 30 can be cycled through such that warning light 10 displays the desired pattern (Step 220). This pattern is then displayed on both warning light 10 and controller 20 (Step 222). If an operator does not want controller 20 to emit light, the light to controller 20 can be turned off at any point in the process by turning control button 32 off (Step 201).

Controller 20 can be detachably or permanently attached in any position in the interior of a vehicle. For example, the controller can be detachably attached using hook and loop fastener. The configuration of light emitting element 14 disclosed in the Figures is especially advantageous in this regard because it emits light in all directions. Therefore, attachment of most angles and positions allows an operator to determine the pattern of the warning light even if part of controller 20 is blocked from view.

Additional advantages and modifications will readily occur to those skilled in the art. Therefore, the disclosed device in its broader aspects is not limited to the specific details and the representative devices shown and described herein. Accordingly, various modifications may be made without departing from the spirit or scope of the general concept as defined by the appended claims and their equivalent.

What is claimed is:

1. A controller for a warning light comprising:
   a controller housing;
   a light emitting element, wherein the light emitting element is at a side periphery of the housing;
   a control unit, wherein the control unit is connected to the light emitting element and to the warning light and further wherein the control unit can control both the light emitting element and the warning light in a same lighting mode, further wherein the controller housing and light emitting element have a same appearance and style as a housing and a light emitting element of the warning light.

2. The controller of claim 1, wherein the control unit is connected to a plurality of the warning lights, wherein the controller simultaneously controls the plurality of warning lights.

3. The controller of claim 1, wherein the control unit connection to the light emitting element and the warning light is a wired connection.

4. The controller of claim 2, wherein the control unit connection to the light emitting element and the warning light is a wireless connection.

5. The controller of claim 1, further comprising a wireless transmitter electrically connected to the control unit, wherein the wireless transmitter controls a wireless receiver in the warning light.

6. The controller of claim 5, wherein the wireless receiver controls the warning light.

7. The controller of claim 1, wherein the light emitting element turns off automatically after a preset period of time.

8. The controller of claim 1, wherein the controller instructs the warning light to turn off automatically after a preset period of time.

9. The controller of claim 1, wherein the light emitting element can be turned off manually.

10. The controller of claim 1 wherein the light emitting element is around the entire periphery of the housing.

11. The controller of claim 1 wherein the light emitting element is around 80% of the periphery of the housing.

12. The controller of claim 1 wherein the light emitting element is a LED light.

13. A method of controlling a warning light, comprising:
activating the warning light by a controller, wherein the controller comprises a controller housing; a light emitting element at a side periphery of the housing; and a control unit, wherein the controller housing and light emitting element have a same appearance and style as a housing and a light emitting element of the warning light, further wherein the control unit is connected to the light emitting element and to the warning light and yet further wherein the control unit can control both the light emitting element and the warning light in a same lighting mode, and instructing the warning light to display a light emitting pattern.

14. The method of claim 13 further comprising instructing the controller to display a light emitting pattern.

15. The method of claim 14 further comprising synchronizing the warning light light emitting pattern and the controller light emitting pattern.

16. The method of claim 14 further comprising instructing the controller to turn off the light emitting pattern.

17. The method of claim 16 wherein the controller light emitting pattern is turned off automatically.

18. The method of claim 14 wherein the peripheral light emitting element is around the entire side periphery of the housing.

* * * * *